(12) United States Patent
Xue et al.

(10) Patent No.: US 12,112,731 B2
(45) Date of Patent: Oct. 8, 2024

(54) METHOD AND APPARATUS FOR GENERATING MUSIC FILE, AND ELECTRONIC DEVICE AND STORAGE MEDIUM

(71) Applicant: Beijing Zitiao Network Technology Co., Ltd., Beijing (CN)

(72) Inventors: Yufan Xue, Beijing (CN); Guanjun Guo, Beijing (CN); Xin Yuan, Beijing (CN); Yuezhao Chen, Beijing (CN); Hao Huang, Beijing (CN); Na Li, Beijing (CN); Xubin Zhou, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/545,825

(22) Filed: Dec. 19, 2023

(65) Prior Publication Data

US 2024/0127777 A1 Apr. 18, 2024

Related U.S. Application Data

(63) Continuation of application No. PCT/CN2022/100969, filed on Jun. 24, 2022.

(30) Foreign Application Priority Data

Jul. 23, 2021 (CN) .......................... 202110839656.2

(51) Int. Cl.
*G10H 1/00* (2006.01)

(52) U.S. Cl.
CPC ......... *G10H 1/0066* (2013.01); *G10H 1/0008* (2013.01)

(58) Field of Classification Search
CPC .......................... G10H 1/0066; G10H 1/0008
See application file for complete search history.

(56) References Cited

U.S. PATENT DOCUMENTS

| 9,424,461 B1 * | 8/2016 | Yuan .................... G06V 20/647 |
| 2006/0156906 A1 | 7/2006 | Haeker |

(Continued)

FOREIGN PATENT DOCUMENTS

| CN | 1287320 A | 3/2001 |
| CN | 113035158 A | 6/2021 |

(Continued)

OTHER PUBLICATIONS

International Search Report in PCT/CN2022/100969, mailed Sep. 21, 2022, 4 pages.

(Continued)

*Primary Examiner* — Jianchun Qin

(74) *Attorney, Agent, or Firm* — Astute IP Law Group

(57) ABSTRACT

The present application relates to the technical field of computers, and discloses a method and apparatus for generating a music file, and an electronic device and a storage medium. The method for generating a music file comprises: obtaining a first image; performing feature extraction on the first image to obtain a salient feature of the first image; mapping the salient feature to a musical instrument digital interface (MIDI) information coordinate system on the basis of the position of the salient feature in the first image, so as to determine MIDI information corresponding to the salient feature, the MIDI information coordinate system being used for indicating a correspondence between MIDI information and time; and generating a music file on the basis of the correspondence between the MIDI information and the time.

19 Claims, 5 Drawing Sheets

(56) References Cited

U.S. PATENT DOCUMENTS

2020/0202825 A1\* 6/2020 Kolen ................... G10H 1/46
2022/0414381 A1\* 12/2022 Gautam ................ G10L 19/02

FOREIGN PATENT DOCUMENTS

JP          2004286918 A    10/2004
JP          2004287144 A    10/2004

OTHER PUBLICATIONS

Wu et al., "A Study of Image-Based Music Composition," 2008 IEEE International Conference on Multimedia and Expo, Aug. 26, 2008, pp. 1346-1348.

\* cited by examiner

METHOD AND APPARATUS FOR GENERATING MUSIC FILE, AND ELECTRONIC DEVICE AND STORAGE MEDIUM

CROSS-REFERENCE TO RELATED APPLICATIONS

This application is a Continuation application of International Patent Application No. PCT/CN2022/100969, filed Jun. 24, 2022, which claims the priority of Chinese patent application filed on Jul. 23, 2021 with the application number of 202110839656.2 and the title is "Method and apparatus for generating music file, and electronic device and storage medium," the disclosures of which are incorporated herein by reference in their entities.

FIELD

The present application relates to the technical field of computers, and particularly relates to a method and an apparatus for generating a music file, and an electronic device and a storage medium.

BACKGROUND

In related technologies, music creation has a high threshold, making it difficult for ordinary users to participate in music creation. The created "music" is generally regarded as the auditory art. Music itself is connected with the listener's auditory senses, but not with the most important sensory "vision", resulting in a simple user experience in the process of music creation.

SUMMARY

The object of embodiments of the present application is to provide a method and an apparatus for generating a music file, and an electronic device and a storage medium, creating music based on a visualized image, giving the user a unique auditory and visual experience.

In a first aspect, embodiments of the present application provide a method for generating a music file, comprising:
  obtaining a first image;
  performing feature extraction on the first image to obtain a salient feature of the first image;
  mapping the salient feature into a musical instrument digital interface (MIDI) information coordinate system based on a position of the salient feature in the first image, so as to determine MIDI information corresponding to the salient feature; the MIDI information coordinate system being used for indicating correspondence between the MIDI information and time;
  generating a music file based on correspondence between the MIDI information and time.

In a second aspect, embodiments of the present application provide an apparatus for generating the music file, comprising:
  an obtaining module for obtaining a first image;
  an extraction module for performing feature extraction on the first image to obtain a salient feature of the first image;
  a processing module for mapping the salient feature into a musical instrument digital interface (MIDI) information coordinate system based on a position of the salient feature in the first image, so as to determine MIDI information corresponding to the salient feature; the MIDI information coordinate system being used for indicating correspondence between the MIDI information and time;
  a generation module for generating a music file based on correspondence between the MIDI information and time.

In a third aspect, embodiments of the present application provide an electronic device, comprising a processor, a memory and a program or instructions stored in the memory and executable on the processor, wherein the program or instructions, when executed by the processor, performs the steps of the method according to the first aspect.

In a fourth aspect, embodiments of the present application provide a readable storage medium, wherein a program or instructions is stored on the readable storage medium, and the program or instructions, when executed by a processor, performs the steps of the method according to the first aspect.

In a fifth aspect, embodiments of the present application provide a chip comprising a processor and a communication interface coupled to the processor, the processor running the program or the instructions to perform the steps of the method according to the first aspect.

In an embodiment of the present application, the image, namely, the above-mentioned first image, is processed so as to convert image information, such as a photograph or a video, into a visual electronic score file, specifically in the MIDI coordinate system, in a manner of displaying track chunks, and these track chunks constitute a salient feature of the first image, i.e., a graph constituted by the track chunks corresponds to the image of the salient feature of the first image. Meanwhile, these track chunks all comprise the MIDI information, and after the MIDI information is identified by a computer, these track chunks are played in a time sequence according to correspondence between the MIDI information and the time so as to form the music.

According to the embodiment of the present application, the music is constructed by image, so that the formed music corresponds to the images containing the memories of users. On the one hand, it lowers the threshold for music creation, so that a "green hand" user who does not have music theory knowledge can also construct corresponding music according to a picture, and on the other hand, track chunks are display by means of the MIDI information coordinate system, so that the final construct music is visualized, giving the user a unique auditory and visual experience.

DETAILED DESCRIPTION OF EMBODIMENTS

In the following, the technical scheme in the embodiment of the application will be clearly described with reference to the drawings in the embodiment of the application. Obviously, the described embodiment is a part of the embodiment of the application, but not the whole embodiment. Based on the embodiments in the present application, all other embodiments obtained by ordinary skilled persons in the art belong to the protection scope of the present application.

The terms "first" and "second" in the specification and claims of the present application are used to distinguish similar objects, and are not used to describe a specific order or sequence. It should be understood that the data used in this way can be interchanged under appropriate circumstances, so that the embodiments of the present application can be implemented in an order other than those illustrated or described here, and the objects distinguished by "first", "second" and the like are usually one class, and the number of objects is not limited, for example, the first object can be one or a plurality. In addition, "and/or" in the specification and claims means at least one of the connected objects, and the character "/" generally means that the contextual objects are in an "or" relationship.

A method and an apparatus for generating a music file, and an electronic device and a storage medium provided by the embodiments of the present application will be described in detail through specific embodiments and application scenarios, with reference to the attached drawings.

Figure 1:
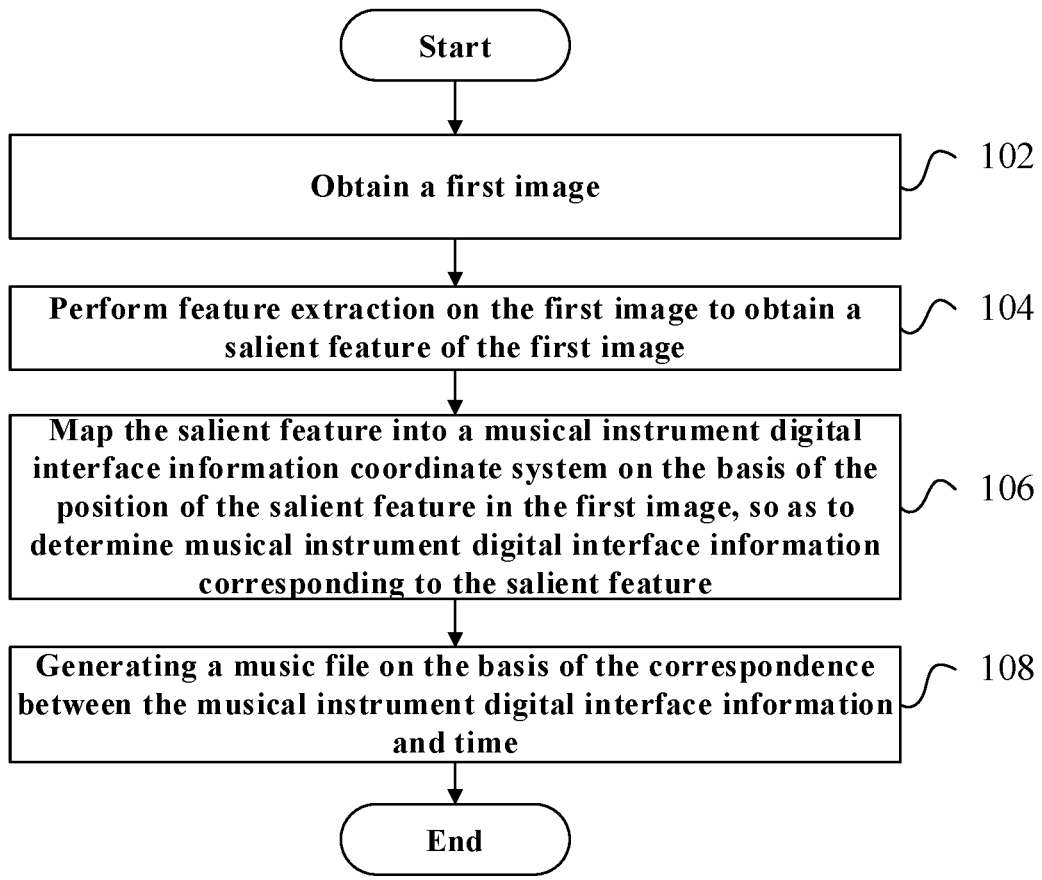
FIG. 1 illustrates one of the flowcharts of a method for generating a music file according to an embodiment of the present application.

In some embodiments of the present application, a method for generating a music file is provided. FIG. 1 illustrates one of the flowcharts of a method for generating a music file according to an embodiment of the present application. As shown in FIG. 1, the method comprises:

Step 102, a first image is obtained;

Step 104, feature extraction is performed on the first image to obtain a salient feature of the first image;

Step 106, the salient feature is mapped into a MIDI (MIDI) information coordinate system based on a position of the salient feature in the first image, so as to determine MIDI information corresponding to the salient feature;

Step 106, the MIDI information coordinate system is used for indicating correspondence between the MIDI information and time;

Step 108, a music file is generated based on correspondence between the MIDI information and time.

In the embodiment of the present application, the first image is specifically a "memory image" selected by a user. Specifically, the first image can be obtained by uploading locally saved photos or videos to a client, and the user can also take photos or record videos through a camera of electronic devices such as mobile phones, so as to obtain the first image.

Herein, when the user chooses to upload the video or record the video through the mobile phone, the first image can be obtained by extracting frames from the video. Here, a frame can be randomly extracted from the video, or a video content can be identified by a neural network model, so as to determine the image frame that can reflect the video theme and extract the same.

Specifically, in some embodiments, obtaining the first image specifically comprises receiving a third input, wherein the third input is an input for selecting the first image; and in response to the third input, a first image is determined.

In other embodiments, obtaining the first image specifically comprises: receiving a fourth input, wherein the fourth input is an input for shooting the video; shooting a video to be processed in response to the fourth input; performing frame extraction on the video to be processed to obtain the first image.

After the first image is obtained, the feature of the first image is further extracted, so that the salient feature of the first image is extracted from the first image. For example, if the first image is a "human face" picture, the salient feature of the first image is a human face outline, positions of five sense organs and so on. If the first image is a full-length or half-length "portrait" picture, the salient feature of the first image is a figure outline, posture and so on of the people therein.

For example, if the first image shows a "moving" object (living creature) such as an animal or a child, the salient feature of the first image may be a figure outline and the positions of five sense organs of the animal or the child. If the first image shows "still" objects (static objects) such as buildings, vehicles, landscapes, etc., the salient feature of the first image can be the overall appearance and salient apparatus of these still objects.

It will be appreciated that different feature extraction granularities can be set according to the specific content of the first image.

Further, after the salient feature of the first image is obtained, according to the position of the salient feature in the first image, the salient feature is mapped in the MIDI information coordinate system, so that an image unit of the salient features is formed into a track chunk in the MIDI information coordinate system. Herein, the MIDI information coordinate system is used to indicate the correspondence between the MIDI information and time, that is, the relationship between the MIDI information corresponding to a track chunk and the time.

Figure 2:
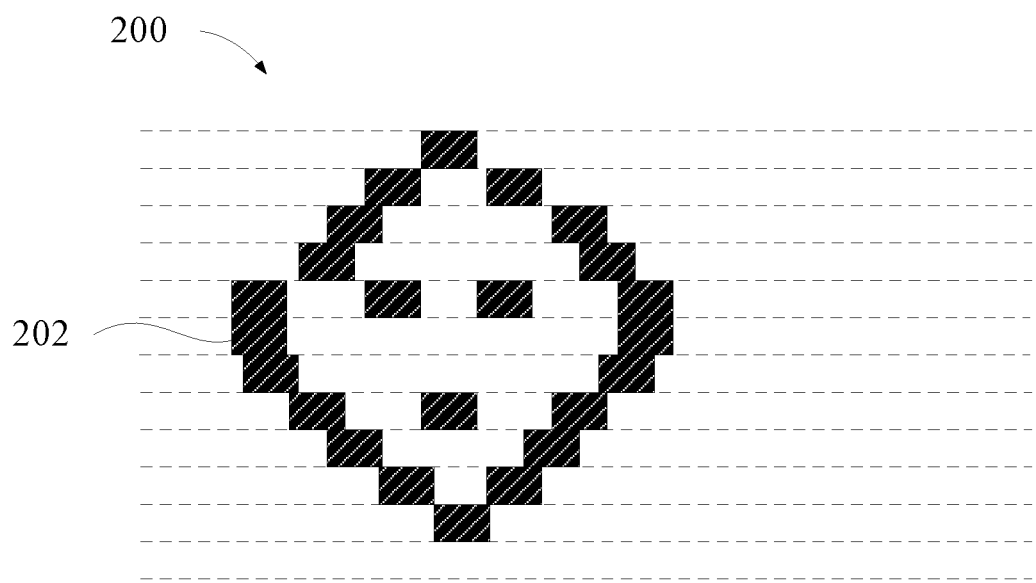
FIG. 2 illustrates an interface schematic diagram of a MIDI information coordinate system of a method for generating the music file according to an embodiment of the present application.

Specifically, FIG. 2 illustrates an interface schematic diagram of a MIDI information coordinate system of a method for generating the music file according to an embodiment of the present application. As shown in FIG. 2, the first image is a human face image, and the salient feature of the human face image is mapped into a plurality of track chunks 202 in the MIDI information coordinate system, and the plurality of track chunks 202 form a shape similar to a human face in the MIDI information coordinate system, and the shape of the human face corresponds to the salient feature of the first image.

Furthermore, the track chunks corresponding to the salient feature have the MIDI information, and the MIDI information is specifically information which can be recognized by a computer device and played as "sounds". When the computer device recognizes the MIDI information, digital signals corresponding to information such as pitch, timbre and volume are obtained according to the MIDI information so as to form a musical motivation, namely, an accent. According to the correspondence between the salient feature and the time, namely, the correspondence between the musical motivation and the time, "sounds" corresponding to the musical motivation are played in sequence and piece of music is thus formed, and such the music is the "images containing memories" selected by the user, namely, a unique piece of music generated on the basis of the first image.

According to the embodiment of the present application, the music is constructed by image, so that the formed music corresponds to the images containing the memories of users. On the one hand, a "green hand" user who does not have music theory knowledge cam also construct corresponding music according to a picture, and on the other hand, track chunks are display by means of the MIDI information coordinate system, so that the final construct music is visualized, giving the user a unique auditory and visual experience.

In some embodiments of the present application, the image content of the first image comprises the salient object, and the salient feature comprises at least one of the following: a key point of the salient object, an edge feature point of the salient object.

In an embodiment of the present application, the salient object is the subject object in the image content of the first image. For example, when the image content of the first image is the human face and a background of flowering shrubs, the salient object is the "human face". As another example, when the image content of the first image is the building and a background of the blue sky, the salient object is the "building".

On this basis, the salient feature specifically comprises the key point of the salient object, such as the key point of the human face, i. e., "five sense organs", and the key point of the building, i. e., the feature design of building, such as "windows" and "courtyards". The salient feature may also comprise the edge feature point of the salient object, and the edge feature point may be formed as a salient object contour, such as the human face contour or a building contour.

Therefore, by extracting the key point of the salient object in the image content, and the edge feature point of the salient object, it is possible to form a "sketch" of the salient object. By the sketch, the viewer can associate a photographed object in the original image, such as "someone" or "a building", arousing the viewer's memories.

By detecting key point and edge feature point, forming salient features of a salient object, and generating music based on the salient features, the embodiments of the present application achieve music visualization, enriching the user's experience from both hearing and vision.

In some embodiments of the present application, performing feature extraction on the first image to obtain the salient feature of the first image comprises:
  performing object segmentation on the first image through a convolutional neural network to obtain the salient object in the first image and the edge feature point of the salient object;
  extracting the key point of the salient object to obtain the key point of the salient object.

In an embodiment of the present application, when performing feature extraction on the first image, first, the first image is performed with object segmentation via a pre-trained convolution neural network. Here, the object segmentation is aimed at segmentation of salient object in the first image.

Specifically, a preset convolutional neural network can be trained through a large number of pre-labeled training sets, so that the trained convolutional neural network can identify the salient object in a picture. For example, with regard to portrait pictures, a training set can be generated by setting up a large number of original human face pictures and the salient object pictures containing only "human face" after the "human face" portion is segmented after image matting. The convolutional neural network is trained by using the training set, so that the convolutional neural network is continuously iterated. When the convolutional neural network can relatively accurately identify the salient object and the edge of the salient object in the picture, the convolutional neural network is ready to come into service.

A convolution neural network trained by the above-mentioned method is used to perform artificial intelligence recognition on the first image so as to determine the salient object therein and the edge of the salient object, and obtain the edge feature point of the salient object.

Furthermore, a specific type of the salient object, such as "a human face", "an animal", "a building", etc. of the salient object is determined via image identification on the salient object, so as to determine a corresponding key point extraction granularity according to the specific type of the salient object, and key point extraction is performed on the salient object according to the corresponding extraction granularity, so as to obtain the key point of the salient object, such as a facial feature, etc.

The present application extracts the salient feature of the salient object in the first image through the trained convolutional neural network quickly and accurately, specifically the key point and the edge feature point of the salient object, thereby improving the processing speed of music generation through the image and being beneficial to improving user experience.

In some embodiments of the present application, prior to mapping the salient feature into the MIDI information coordinate system based on the position of the salient feature in the first image, the method for generating the music file further comprises:
  generating the salient object texture map corresponding to the first image according to the salient feature;
  determining the position of the salient feature in the first image according to the salient object texture map.

In an embodiment of the present application, the salient object texture map corresponding to the first image is generated according to the salient feature of the first image. Herein, in the salient object texture map, i. e., an image showing only the salient feature of the salient object in the first image. In one exemplary embodiment, the salient object texture map comprises only two types of pixels, a first type of pixel for displaying salient feature and a second type of pixel for a position of the non-salient feature.

Figure 3:
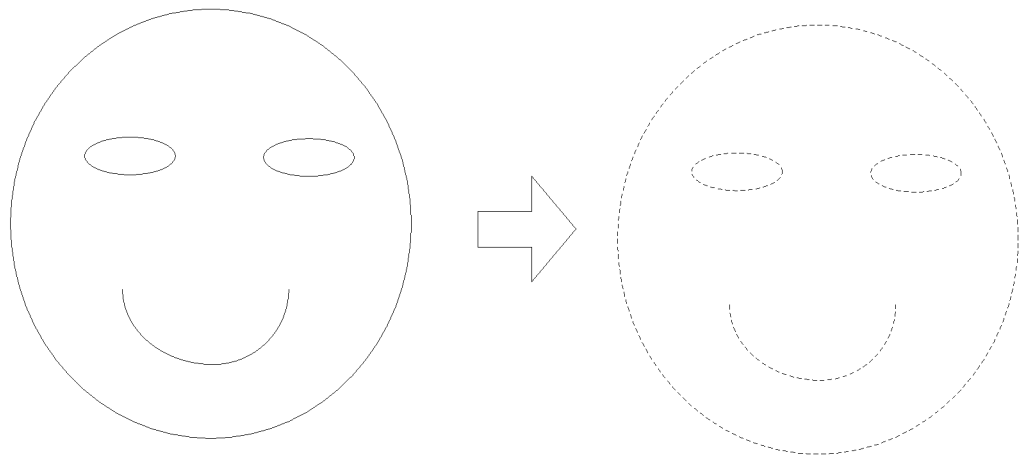
FIG. 3 illustrates a schematic diagram of a salient object texture map of a method for generating the music file according to an embodiment of the present application.

FIG. 3 illustrates a schematic diagram of a salient object texture map of a method for generating the music file according to an embodiment of the present application. As shown in FIG. 3, the first image is the human face image in which the salient object is a human face, and at this time, the salient object texture map looks like a sketch of the human face.

Since the salient object texture map is an image processing the first image as displaying only the salient feature, when determining the position of the salient feature in the first image, the position of the salient feature can be determined according to the salient object texture map. Thereby, the salient feature is mapped into the MIDI information coordinate system, and the conversion process from the image to the MIDI electronic score and finally to music is realized, realizing "from image to music" and giving the user a unique experience.

Figure 4:
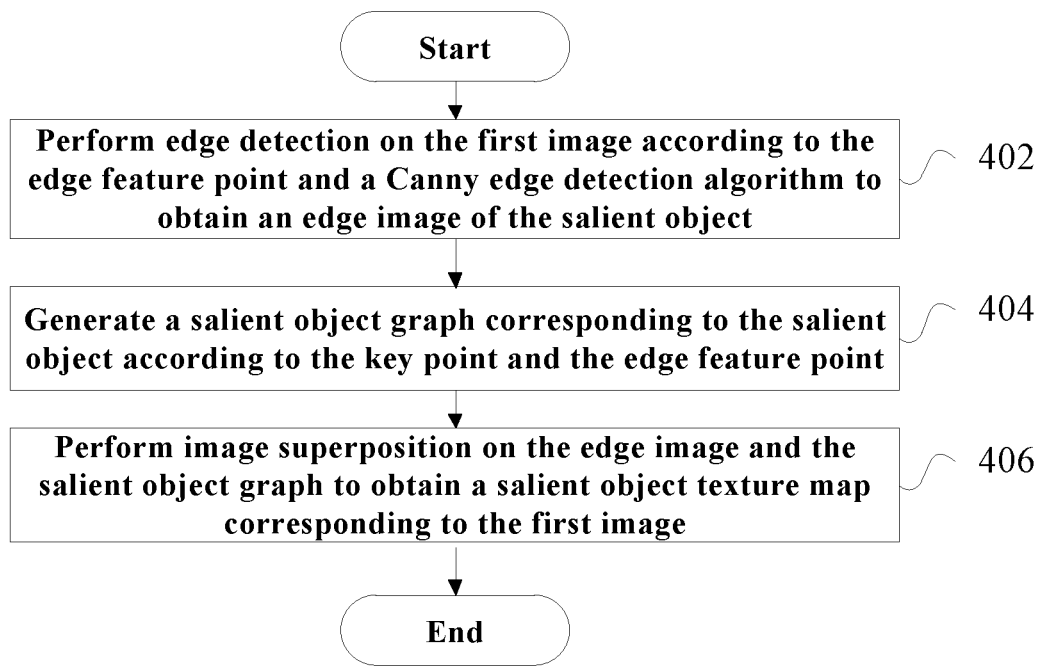
FIG. 4 illustrates the second flow chart of the method for generating the music file according to the embodiment of the present application.

In some embodiments of the present application, FIG. 4 illustrates the second flow chart of the method for generating the music file according to the embodiment of the present application. As shown in FIG. 4, the step of generating the salient object texture map corresponding to the first image according to a salient feature comprises the following steps:

Step 402, performing edge detection on the first image according to the edge feature point and the Canny edge detection algorithm to obtain an edge image of the salient object;

Step 404, generating a salient object graph corresponding to the salient object according to the key point and the edge feature point;

Step 406, performing image superposition on the edge image and the salient object graph to obtain a salient object texture map corresponding to the first image.

In an embodiment of the present application, when generating the salient object texture map based on salient feature, first, edge detection is performed by the Canny edge detection algorithm based on the edge feature point. The Canny edge detection algorithm is a multi-level edge detection algorithm developed by John F. Canny in 1986.

Specifically, when performing edge detection on the first image through the Canny edge detection algorithm, first performing Gaussian filtering on the first image, that is to say, using a Gaussian matrix, removing the average value of the weight for each pixel point and neighborhood thereof for use as a grey value of the pixel. Furthermore, a gradient value and a gradient direction are calculated, and a non-maximum value is filtered, and finally an edge detection is performed using a set threshold range to obtain the edge image of the salient object.

Further, a salient object graph corresponding to the salient object, i. e., a feature map formed by the key point and the edge feature point, is generated according to the key point of the salient object and the edge feature point of the salient object.

Furthermore, image superposition is performed on the edge image and the salient object picture, so that the edge image is connected to the edge feature point, equivalent to drawing each key point together with the contour, and finally the salient object texture image with the clear contour is obtained.

In some embodiments of the present application, determining the position of the salient feature in the first image according to the salient object texture map comprises:
dividing the object texture map into X×Y image units with x rows and y columns, wherein both x and y are integers greater than 1, and the image units comprise at least one of bright pixels and dark pixels, and the bright pixels are pixels with a brightness value of 1 and the dark pixels are pixels with a brightness value of 0;
determining an object image unit with the number ratio of bright pixels greater than a preset ratio among X×Y image units to obtain N object image units, wherein the number of salient features of the first image is N, and the N object image units are in one-to-one correspondence with then salient features, and n is a positive integer;

determining a first ordinate of the salient feature in the first image according to the number of rows of each of the n object image units in the X×Y image units;
determining a first abscissa of the salient feature in the first image according to the number of columns of each of the n object image units in the X×Y image units;
determining the position of the salient feature in the first image according to an abscissa of the salient feature and an abscissa and an ordinate and of the salient feature.

In the embodiment of the present application, firstly, the object texture map is divided into X rows and Y columns to obtain an X×Y graphics matrix, wherein the graphics matrix comprises X×Y graphics units. Each image unit comprises a plurality of pixels, comprising bright pixels for displaying the salient feature and having a brightness value of 1, and dark pixels outside the salient feature and having a brightness value of 0, i. e., "pure black" is displayed.

Further, the ratio of the bright pixels in each image unit in the X×Y image units is determined separately. For example, assuming that the number of pixels in an image unit is 10, comprising 6 bright pixels and 4 dark pixels, the ratio of the number of bright pixels is 0.6.

After the ratio of the number of bright pixels in each image unit is determined, respectively determining whether the ratio of the bright pixels in each image unit is greater than the preset ratio. The range of the preset ratio is greater than or equal to 0.2, preferably 0.4. Taking a preset ratio of 0.4 as an example, if there are 4 or more bright pixels among 10 pixels in one image unit, the image unit is marked as an object image unit for indicating the presence of the salient feature in the object image unit.

Figure 5:
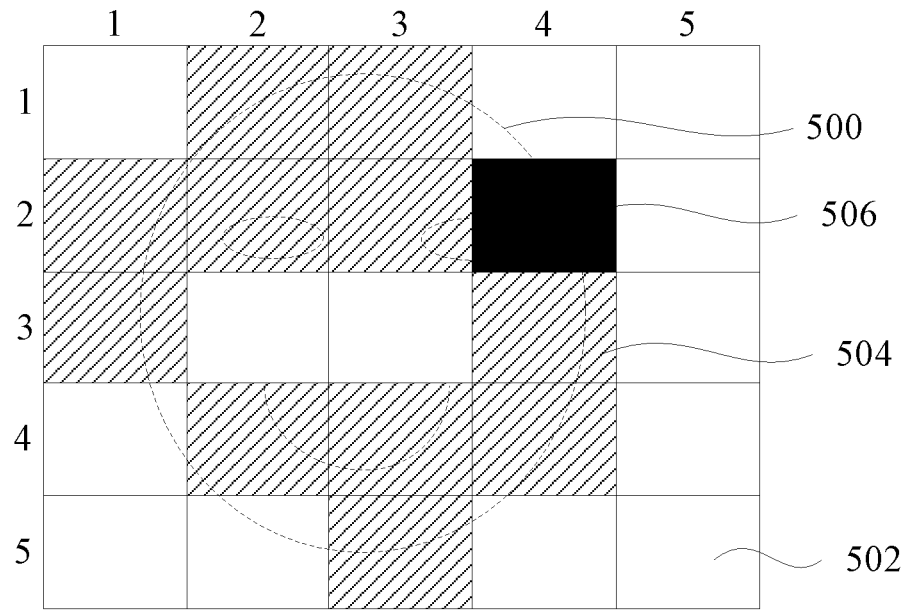
FIG. 5 illustrates a schematic diagram showing the division of an object texture map of a method for generating the music file according to an embodiment of the present application.

After determining all object image units among all X×Y image units, these object image units are the salient feature ultimately mapped in the MIDI information coordinate system. FIG. 5 illustrates a schematic diagram showing the division of an object texture map of a method for generating the music file according to an embodiment of the present application. As shown in FIG. 5, an object texture map 500 is divided into 25 image units 502 in 5×5. Here, the hatched, i. e., an object image unit 504 is a unit of the salient feature.

Further, taking a black-filled image unit 506 in FIG. 5 as an example, the image unit 506 being located in the fourth column and the second row, the corresponding salient feature of the image unit 506 can be determined, i.e., the first abscissa $4x$ and the first ordinate $2y$ in the first image.

Similarly, according to the same method, a first abscissa and a first ordinate of each object image unit are determined, thereby obtaining the position of each salient feature in the first image.

The embodiment of the present application divides the object texture map corresponding to the first image so as to determine the object image unit according to the ratio of the number of bright pixels in the divided X×Y image units, maps the object image unit as a salient feature into the MIDI information coordinate system, realizing the conversion from the image to a MIDI electronic score, thereby realizing the conversion from FIG. 4 image to music. Meanwhile, the music is visualized, enriching a user's experience from both hearing and vision.

In some embodiments of the present application, mapping the salient feature into the MIDI information coordinate system based on the position of the salient feature in the first image comprises:

converting the first ordinate into the MIDI information coordinate system to obtain a second ordinate of the salient feature in the MIDI information coordinate system;

converting the first abscissa into the MIDI information coordinate system to obtain a second abscissa of the salient feature in the MIDI information coordinate system;

according to the second ordinate and the second abscissa, mapping the n salient features into the MIDI information coordinate system to obtain n track chunks corresponding to the n salient features one by one.

In an embodiment of the present application, when the salient feature is mapped to the MIDI information coordinate system, the first abscissa and the first ordinate of the salient feature obtained above may be synchronously converted to the second abscissa and the second ordinate under the MIDI information coordinate system, thereby achieving the mapping of the salient feature in the MIDI information coordinate system.

Herein, all the N salient features are mapped into the MIDI information coordinate system to obtain N track chunks corresponding to the N salient features on a one-to-one basis, and the N track chunks are displayed and played via a musical instrument digital interface program, so that visualized music can be obtained. On the one hand, the image feature of the salient object in the first image is retained, and on the other hand, unique music corresponding to the salient object in the first image can be generated.

Specifically, the MIDI information coordinate system is used for indicating the correspondence between the MIDI information and the time. Therefore, according to the salient feature, namely, a coordinate of the track chunk in the MIDI information coordinate system, the MIDI information and time information of the track chunk can be determined. After identifying the MIDI information and the time information of the track chunk, a computer program can convert same into a musical motivation, wherein the musical motivation has sound attributes such as timbre, pitch and volume, and also has a time attribute of a beat. A plurality of track chunks corresponding to a plurality of salient features are played according to the MIDI information and the time information thereof to obtain the music converted from the first image, namely, the music matching the user's "images containing memories", satisfying the user's demand for unique music creation.

In some embodiments of the present application, a track chunk contains the MIDI information which is determined according to the second ordinate corresponding to the track chunk. Here, the MIDI information comprises at least one of the following information: pitch, timbre, volume.

In an embodiment of the present application, the second ordinate of the track chunk in the MIDI information coordinate system is the MIDI information corresponding to the track chunk. Specifically, in the MIDI information coordinate system, the second ordinate represents the MIDI information of the track chunk, comprising MIDI pitch, MIDI timbre, and MIDI volume. Specifically, for every increment of 1 in the ordinate, a scale is incremented by 1, and for every increment of 8 in the ordinate, the scale is incremented by one octave.

Meanwhile, according to the second coordinate, the timbre and volume of the track chunk can also be obtained. When the pitch of the track chunk is higher, for example, if the pitch of a track chunk is in the range of the treble scale, the more crisp timbre can be set for it, such as the timbre of musical instruments such as the violin and the flute, and if the pitch of a track chunk is in the alto scale range, the timbre of the instrument for the main melody such as the piano and the guitar can be set for it, and if the pitch of a track chunk is in the bass scale range, the timbre of the musical instrument with heavy tone such as the organ and the bass can be set for it.

Similarly, the greater volume can be set to track chunks in the alto scale range to highlight the main melody, while the volume can be reduced appropriately to prevent stress on the user's ears for the track chunks in the treble scale range and bass scale range.

The present application sets the MIDI information of the track chunks on the basis of the second ordinate of the track chunk, and specifically sets music attributes such as pitch, timbre and volume of the track chunk so as to make the generated music more consistent with music theory and improve the effect of generating music from pictures.

Figure 6:
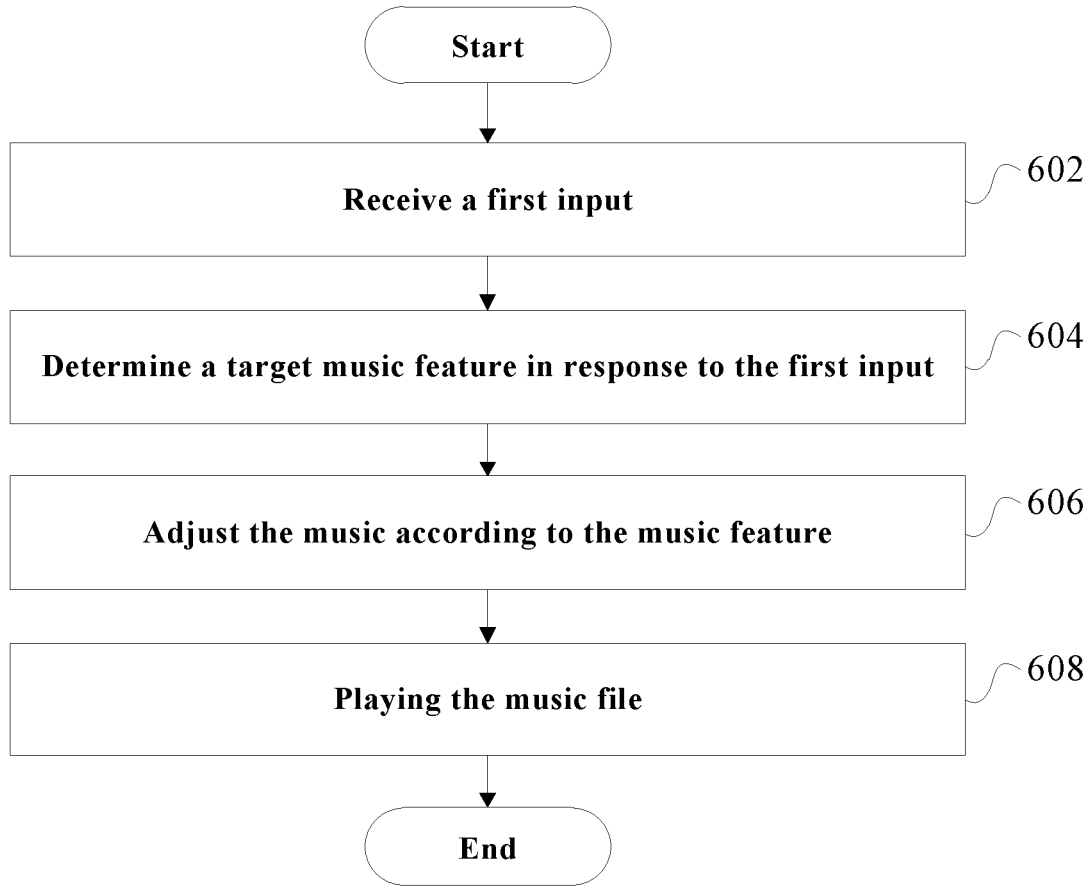
FIG. 6 illustrates the third flow chart of the method for generating the music file according to the embodiment of the present application.

In some embodiments of the present application, FIG. 6 illustrates the third flow chart of the method for generating the music file according to the embodiment of the present application. As shown in FIG. 6, the method further comprises:

Step 602, receiving a first input;

Step 602, the first input is an input for selecting a preset music feature; in this step, the first input is a user input received through a human-computer interaction component, the first input comprising: one or more combinations of a touch input, biometric input, a click input, a somatosensory input, a voice input, a keyboard input, or a press input, wherein: the touch input comprises, but is not limited to, a point touch, a sliding or a specific touch gesture, etc.; the biological recognition input comprises, but is not limited to, a biological information input such as fingerprint, iris, voice print or facial recognition, etc.; the click input comprises, but is not limited to, a mouse click, switch click, etc.; the somatosensory input comprises, but is not limited to, sway electronics, flip electronics, and the like; the press input comprises, but is not limited to, a press input to a touch screen, a press input to a bezel, a press input to a back cover, or a press input to portions of other electronic devices. Embodiments of the present application do not limit the specific form of the first input.

Step 604, determining a target music feature in response to the first input;

Step 604, the target music feature comprises at least one of the following: music style, music mood and music genre;

Step 606, adjusting the music according to the music feature;

Step 608, playing the music file.

In an embodiment of the present application, the user can perform music theory adjustment on music generated according to the first image by selecting a plurality of preset music features and selecting the target music feature. Herein, target music feature, comprises a music style, such as: pop music, classical music, electronic music, etc., musical mood such as: enrichment, depression, relaxation, etc., and musical genre, such as: rock, jazz, blue, etc.

According to the target music feature selected by the user, the music generated according to the first image is adjusted so as to make the adjusted music more consistent with the music feature selected by the user, and if the user selects classical music, soothing and blue tone, the volume of the middle frequency and the low frequency can be appropriately increased. Meanwhile, a time interval of the second abscissa is adjusted so as to make the music rhythm slower and soothing.

Meanwhile, the second ordinate of the track chunk in the MIDI coordinate system can also be further post-processed according to the preset music theory data and acoustic data. For example, a tunability can be preset, and the range of the highest scale and the lowest scale can be specified. If the highest scale and the lowest scale of the track chunk within a period of time exceed the range, the pitch of the track chunk outside the range is adjusted according to a certain adjustment rule, i. e., adjusting the pitch outside the range into the tone. For example, decreasing the pitch of the track chunk above the highest scale threshold by one octave, or increasing the pitch of the track chunk below the lowest scale threshold by one octave, etc. so that the adjusted music is more consistent with the music theory. After adjustment, the adjusted music can be automatically played, enabling the user to immediately get the music generated according to the "images containing memories" selected by the user and enjoy the pleasure of music creation.

In some embodiments of the present application, the method of generating a music file further comprises: generating a second image corresponding to the music;
playing the music comprising: displaying the second image and playing the music.

In an embodiment of the present application, it is also possible to generate the second image corresponding to playing the music file, and display the second image while playing the music file, so that the user experiences both visual and auditory enjoyment. Herein, the second image may be a still picture generated according to the first image selected by the user, or a salient feature texture map corresponding to the first image, and the still picture and a playing progress of the music are displayed when the music file is played.

The second image can also be an animation file generated according to a preset template, or a playing interface of the MIDI information coordinate system, and the duration of the animation file matches that of the generated music, and the animation is played while the music file is played so as to further improve the visual experience of the user.

In some embodiments of the present application, generating the second image corresponding to the music file comprises:
receiving a second input, wherein the second input is an input for selecting a preset video template;
determining an object video template in response to the second input;
generating the second image according to the object video template and the salient object texture map.

In an embodiment of the present application, a background image when music is played may be generated by receiving the second input from the user, an object video template selected according to the second input from the user, and the salient object texture map corresponding to the first image. The video template can be a continuous animation template, and can also be a "slide" showing multiple still pictures in turns.

In the animation template, the salient object texture map corresponding to the first image is displayed in a superimposed manner, and when the user sees the second image, the memory of the first image may be aroused and this may improve the user's use experience.

In this embodiment, the second input is a user input received through the human-computer interaction component, the second input comprising: one or more combinations of a touch input, biometric input, a click input, a somatosensory input, a voice input, a keyboard input, or a press input, wherein: the touch input comprises, but is not limited to, a point touch, a sliding or a specific touch gesture, etc.; the biological recognition input comprises, but is not limited to, a biological information input such as fingerprint, iris, voice print or facial recognition, etc.; the click input comprises, but is not limited to, a mouse click, switch click, etc.; the somatosensory input comprises, but is not limited to, sway electronics, flip electronics, and the like; the press input comprises, but is not limited to, a press input to a touch screen, a press input to a bezel, a press input to a back cover, or a press input to portions of other electronic devices. Embodiments of the present application do not limit the specific form of the second input.

In some embodiments of the present application, generating the second image corresponding to the music file comprises:
generating an object animation through a piano roll graphical interface, wherein the object animation is used for showing a playing progress of the music;
generating the second image according to the object animation and the salient object texture map.

Figure 7:
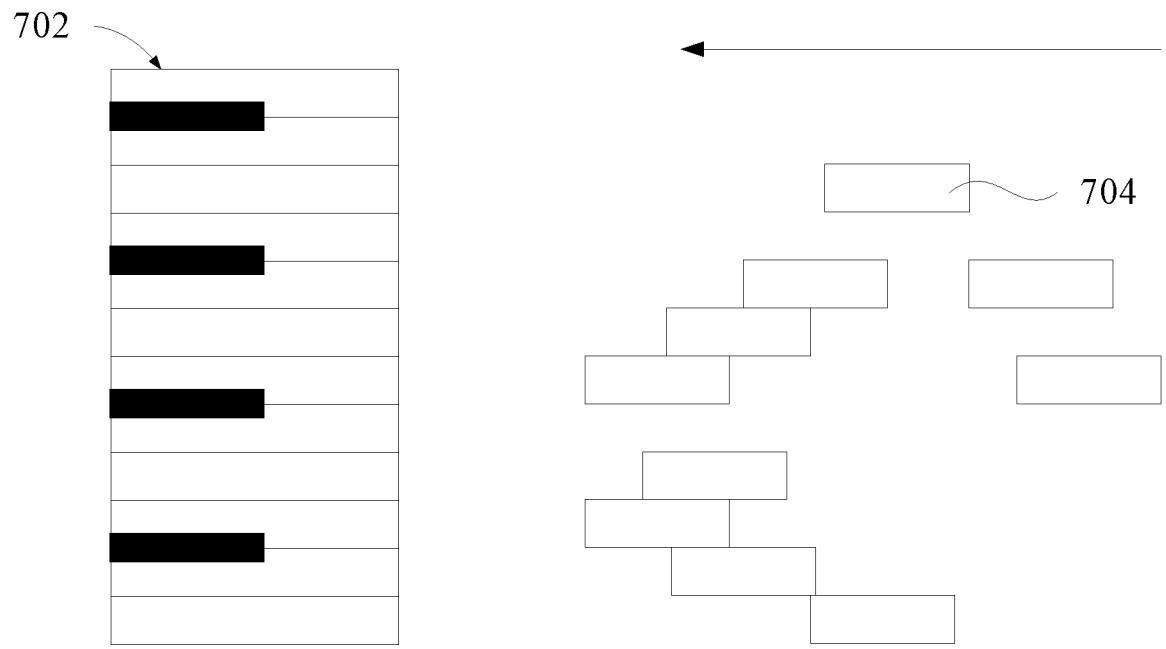
FIG. 7 illustrates a schematic diagram of a piano roll graphic interface in the method for generating the music file according to the embodiment of the present application.

In an embodiment of the present application, the object animation is generated via the piano roll graphical interface, wherein the object animation is a process of playing the track chunk in a MIDI file in the piano roll graphical interface. Specifically, FIG. 7 illustrates a schematic diagram of a piano roll graphic interface in the method for generating the music file according to the embodiment of the present application, wherein a key 702 of the animation image of the piano is on the left, and a track chunk 704 is in the interface gradually toward the key 702 according to corresponding time information.

Meanwhile, in the background of the interface, according to the salient object texture map corresponding to the first image as a background image of the second image, an explicit visual connection is established between the second image and the first image, so that the user can watch the second image associated with the "image containing memories" while listening to music, thereby arousing the user's memory and enriching the user's visual experience.

Figure 8:
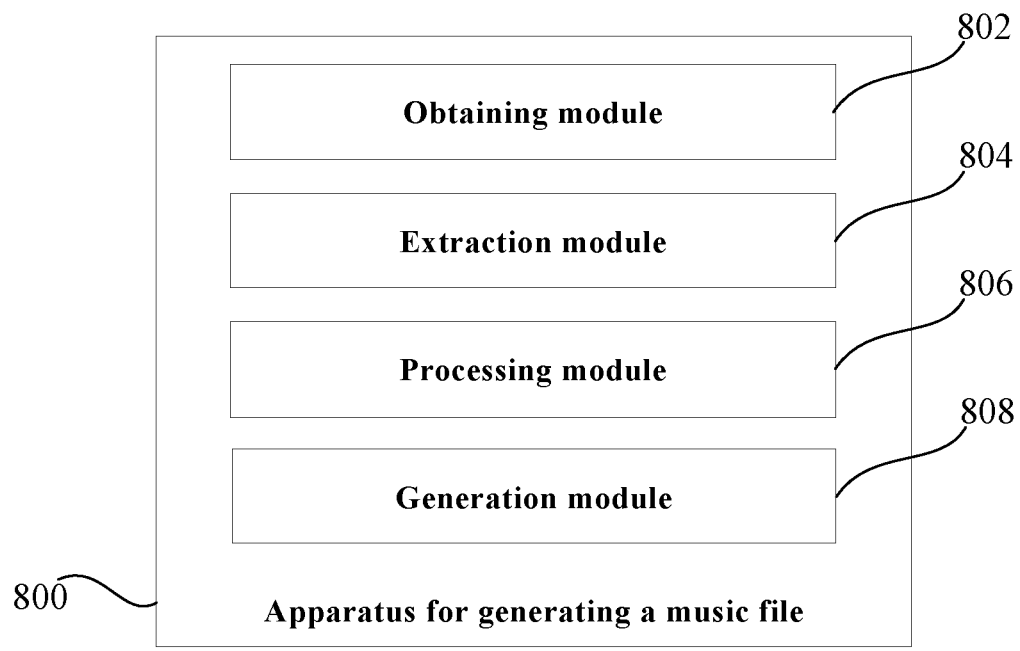
FIG. 8 illustrates a structural block diagram of an apparatus for generating the music file according to an embodiment of the present application.

In some embodiments of the present application, an apparatus for generating a music file is provided. FIG. 8 illustrates a structural block diagram of an apparatus for generating the music file according to an embodiment of the present application. As shown in FIG. 8, an apparatus for generating the music file 800 comprises:
an obtaining module 802 for obtaining the first image;
an extraction module 804 for performing feature extraction on the first image to obtain the salient feature of the first image;
a processing module 806 for mapping the salient feature into a MIDI information coordinate system based on a position of the salient feature in the first image, so as to determine MIDI information corresponding to the salient feature; the MIDI information coordinate system being used for indicating correspondence between the MIDI information and the time;
a generation module 808 for generating the music file based on correspondence between the MIDI information and the time.

In an embodiment of the present application, the first image is specifically a "images containing memories" selected by the user. In particular, the first image can be obtained by uploading a locally saved photograph or video to a client, and the user can also take a photograph or record a video via a camera of an electronic device such as a mobile phone so as to obtain the first image.

When the user selects to upload the video or record the video via the mobile phone, the first image can be obtained by frame extraction in the video. Herein, a frame can be randomly extracted from the video, and the video content can also be identified via the neural network model so as to determine that an image frame which can embody the video theme is extracted.

Specifically, in some embodiments, obtaining the first image specifically comprises: receiving a third input, wherein the third input is an input selecting the first image; in response to the third input, determining the first image.

In further embodiments, obtaining the first image specifically comprises: receiving a fourth input, wherein the fourth input is an input to capture the video; in response to the fourth input, photographing a video to be processed; performing frame extraction on the video to be processed to obtain the first image.

After the first image is obtained, the feature extraction is further performed on the first image to extract the salient feature of the first image. For example, if the first image is a "human face" picture, the salient feature of the first image is a human face contour, positions of five sense organs and so on. If the first image is a full-length or half-length "portrait" picture, the salient feature of the first image is a figure outline, posture and so on of the people in the picture.

Continuing with the example, if the first image shows a "moving" object (living creature) such as an animal or a child, the salient feature of the first image may be a figure outline and the positions of five sense organs of the animal or the child. If the first image shows "still" objects (static objects) such as buildings, vehicles, landscapes, etc., the salient feature of the first image can be the overall appearance and salient apparatus of these still objects.

It will be appreciated that that different feature extraction granularities can be set according to the specific content of the first image.

Further, after the salient feature of the first image is obtained, according to the position of the salient feature in the first image, the salient feature is mapped in the MIDI information coordinate system, so that the image unit of the salient features is formed into a track chunk in the MIDI information coordinate system. Herein, the MIDI information coordinate system is used to indicate the correspondence between the MIDI information and time, that is, the relationship between MIDI information corresponding to the track chunk and the time.

Furthermore, the track chunks corresponding to the salient feature have musical instrument digital interface information, namely, MIDI information, and the MIDI information is specifically information which can be recognized by a computer device and played as "sounds". When the computer device recognizes the MIDI information, digital signals corresponding to information such as pitch, timbre and volume are obtained according to the MIDI information so as to form a musical motivation, namely, an accent. According to the correspondence between the salient feature and the time, namely, the correspondence between the musical motivation and time, "sounds" corresponding to the musical motivation are played in sequence and piece of music is thus formed, i. e., a unique piece of music generated on the basis of the "images containing memories" selected by the user, i. e., the first image.

According to the embodiment of the present application, the music is constructed by image, so that the formed music corresponds to the images containing the memories of users.

On the one hand, the "green hand" user who does not have music theory knowledge cam also construct corresponding music according to a picture, and on the other hand, track chunks are display by means of the MIDI information coordinate system, so that the final construct music is visualized, giving the user a unique auditory and visual experience.

In the apparatus for generating the music file of some embodiments of the present application, the image content of the first image comprises the salient object, and the salient feature comprises at least one of the following: the key point of salient objects, the edge feature point of salient object.

In an embodiment of the present application, the salient object is the subject object in the image content of the first image. For example, when the image content of the first image is the human face and a background of flowering shrubs, the salient object is the "human face". As another example, when the image content of the first image is the building and a background of the blue sky, the salient object is the "building".

On this basis, the salient feature specifically comprises the key point of the salient object, such as the key point of the human face, i. e., "five sense organs", and the key point of the building, i. e., the feature design of building, such as "windows" and "courtyards". The salient feature may also comprise the edge feature point of the salient object, and the edge feature point may be formed as the contour of the salient object, such as the human face contour or a building contour.

Therefore, by extracting the key point of the salient object in the image content, and the edge feature point of the salient object, it is possible to form the "sketch" of the salient object. By the sketch, the viewer can associate the photographed object in the original image, such as "someone" or "a building", arousing the memories of the viewer.

By detecting key point and edge feature point, forming salient features of a salient object, and generating music based on the salient features, the embodiments of the present application achieve music visualization, giving the user a unique auditory and visual experience.

For the apparatus for generating the music file of some embodiments of the present application, the processing module is further used for performing feature extraction on the first image to obtain the salient feature of the first image comprises: performing object segmentation on the first image through a convolutional neural network to obtain the salient object in the first image and the edge feature point of the salient object extracting the key point of the salient object to obtain the key point of the salient object.

In an embodiment of the present application, when performing feature extraction on the first image, first, the first image is performed with object segmentation via the pre-trained convolution neural network. Here, the object segmentation is aimed at segmentation of salient object in the first image.

Specifically, a preset convolutional neural network can be trained through a large number of pre-labeled training sets, so that the trained convolutional neural network can identify the salient object in a picture. For example, with regard to portrait pictures, a training set can be generated by setting up a large number of original human face pictures and the salient object pictures containing only "human face" after the "human face" portion is segmented after image matting. The convolutional neural network is trained by using the training set, so that the convolutional neural network is continuously iterated. When the convolutional neural network can relatively accurately identify the salient object and the edge of the salient object in the picture, the convolutional neural network is ready to come into service.

The convolution neural network trained by the above-mentioned method is used to perform artificial intelligence recognition on the first image so as to determine the salient object therein and the edge of the salient object, and obtain the edge feature point of the salient object.

Furthermore, a specific type of the salient object, such as "a human face", "an animal", "a building", etc. of the salient object is determined via image identification on the salient object, so as to determine a corresponding key point extraction granularity according to the specific type of the salient object, and key point extraction is performed on the salient object according to the corresponding extraction granularity, so as to obtain the key point of the salient object, such as a facial feature, etc.

The present application extracts the salient feature of the salient object in the first image through the trained convolutional neural network quickly and accurately, specifically the key point and the edge feature point of the salient object, improving the processing speed of music generation through the image and being beneficial to improving user experience.

For the apparatus for generating the music file of some embodiments of the present application, the generation module is further used for generating the salient object texture map corresponding to the first image according to the salient feature;

The processing module is further configured to determine the position of the salient feature in the first image based on the salient object texture map.

In an embodiment of the present application, the salient object texture map corresponding to the first image is generated according to the salient feature of the first image. Herein, the salient object texture map is an image showing only the salient feature of the salient object in the first image. In one exemplary embodiment, the salient object texture map comprises only two types of pixels, a first type of pixel for displaying salient feature and a second type of pixel for a position of the non-salient feature.

Since the salient object texture map is an image processing the first image as displaying only the salient feature, when determining the position of the salient feature in the first image, the position of the salient feature can be determined according to the salient object texture map. Thereby, the salient feature is mapped into the MIDI information coordinate system, and the conversion process from the image to the MIDI electronic score and finally to music is realized, realizing "from image to music" and giving the user a unique experience.

In the apparatus for generating the music file according to some embodiments of the present application, the processing module is further used for performing edge detection on the first image according to the edge feature point and the Canny edge detection algorithm to obtain the edge image of the salient object;

The generation module is further used for generating the salient object graph corresponding to the salient object according to the key point and the edge feature point; the edge image and the salient object picture are superimposed to obtain the salient object texture image corresponding to the first image.

In an embodiment of the present application, when generating the salient object texture map based on the salient feature, first, edge detection is performed by the Canny edge detection algorithm based on edge feature point. Specifically, when performing edge detection on the first image through the Canny edge detection algorithm, first performing Gaussian filtering on the first image, that is to say, using the Gaussian matrix, removing the average value of the weight for each pixel point and neighborhood thereof for use as a grey value of the pixel. Furthermore, the gradient value and the gradient direction are calculated, and the non-maximum value is filtered, and finally the edge detection is performed using the set threshold range to obtain the edge image of the salient object.

Further, the salient object graph corresponding to the salient object, i. e., the feature map formed by the key point and the edge feature point, is generated according to the key point of the salient object and the edge feature point of the salient object.

Furthermore, image superposition is performed on the edge image and the salient object picture, so that the edge image is connected to the edge feature point, equivalent to drawing each key point together with the contour, and finally the salient object texture image with the clear contour is obtained.

In the apparatus for music file generating of some embodiments of the present application, the processing module is further for:

dividing the object texture map into X×Y image units with x rows and y columns, wherein both x and y are integers greater than 1, and the image units comprise at least one of bright pixels and dark pixels, and the bright pixels are pixels with a brightness value of 1 and the dark pixels are pixels with a brightness value of 0; determining an object image unit with the number of bright pixels greater than the preset ratio among X×Y image units to obtain n object image units, wherein the number of salient features of the first image is n, and the n object image units are in one-to-one correspondence with the n salient features, and n is a positive integer;

determining a first ordinate of the salient feature in the first image according to the number of rows of each of the n object image units in the X×Y image units; determining a first abscissa of the salient feature in the first image according to the number of columns of each of the n object image units in the X×Y image units; determining the position of the salient feature in the first image according to the abscissa of the salient feature and an abscissa and the ordinate and of the salient feature.

In the embodiment of the present application, firstly, the object texture map is divided into X rows and Y columns to obtain an X×Y graphics matrix, wherein the graphics matrix comprises X×Y graphics units. Each image unit comprises a plurality of pixels, comprising bright pixels for displaying the salient feature and having a brightness value of 1, and dark pixels outside the salient feature and having a brightness value of 0, i. e., "pure black" is displayed.

Further, the ratio of the bright pixels in each image unit in the X×Y image units is determined separately. For example, assuming that the number of pixels in the image unit is 10, comprising 6 bright pixels and 4 dark pixels, the ratio of the number of bright pixels is 0.6.

After the ratio of the number of bright pixels in each image unit is determined, respectively determining whether the ratio of the bright pixels in each image unit is greater than the preset ratio. The range of the preset ratio is greater than or equal to 0.2, preferably 0.4. Taking a preset ratio of 0.4 as an example, if there are 4 or more bright pixels among 10 pixels in one image unit, the image unit is marked as the object image unit for indicating the presence of the salient feature in the object image unit.

After determining all object image units among all X×Y image units, these object image units are the salient feature ultimately mapped in the MIDI information coordinate system.

The embodiment of the present application divides the object texture map corresponding to the first image so as to determine the object image unit according to the ratio of the number of bright pixels in divided X×Y image units. The object image unit as the salient feature is mapped into the MIDI information coordinate system, realizing the conversion from the image to the MIDI electronic score, thereby realizing the conversion from image to music. Meanwhile, the music is visualized, giving the user a unique auditory and visual experience.

In the apparatus for generating the music file of some embodiments of the present application, the processing module is further used for converting the first ordinate into the MIDI information coordinate system to obtain the second ordinate of the salient feature in the MIDI information coordinate system; converting the first abscissa into the MIDI information coordinate system to obtain the second abscissa of the salient feature in the MIDI information coordinate system; according to the second ordinate and the second abscissa, mapping the n salient features into the MIDI information coordinate system to obtain n track chunks corresponding to the n salient features one by one.

In an embodiment of the present application, when the salient feature is mapped to the MIDI information coordinate system, the first abscissa and the first ordinate of the salient feature obtained above may be synchronously converted to the second abscissa and the second ordinate under the MIDI information coordinate system, thereby achieving the mapping of the salient feature in the MIDI information coordinate system.

Herein, all the N salient features are mapped into the MIDI information coordinate system to obtain N track chunks corresponding to the N salient features on a one-to-one basis, and the N track chunks are displayed and played via the musical instrument digital interface program, so that visualized music can be obtained. On the one hand, the image feature of the salient object in the first image is retained, and on the other hand, unique music corresponding to the salient object in the first image can be generated.

Specifically, the MIDI information coordinate system is used for indicating the correspondence between the MIDI information and the time. Therefore, according to the salient feature, namely, the coordinate of the track chunk in the MIDI information coordinate system, the MIDI information and the time information of the track chunk can be determined. After identifying the MIDI information and the time information of the track chunk, a computer program can convert same into a musical motivation, wherein the musical motivation has sound attributes such as timbre, pitch and volume, and also has a time attribute of the beat. A plurality of track chunks corresponding to a plurality of salient features are played according to the MIDI information and the time information thereof to obtain the music converted from the first image, namely, the music matching the user's "images containing memories", satisfying the user's demand for unique music creation.

In the apparatus for generating the music file of some embodiments of the present application, the track chunk contains the MIDI information which is determined according to the second ordinate corresponding to the track chunk. Here, the MIDI information comprises at least one of the following information: pitch, timbre, volume.

In an embodiment of the present application, the second ordinate of the track chunk in the MIDI information coordinate system is the MIDI information corresponding to the track chunk. Specifically, in the MIDI information coordinate system, the second ordinate represents the MIDI information of the track chunk, comprising MIDI pitch, MIDI timbre, and MIDI volume. Specifically, for every increment of 1 in the ordinate, a scale is incremented by 1, and for every increment of 8 in the ordinate, the scale is incremented by one octave.

Meanwhile, according to the second coordinate, the timbre and volume of the track chunk can also be obtained. When the pitch of a track chunk is higher, for example, if the pitch of a track chunk is in the range of the treble scale, the more crisp timbre can be set for it, such as the timbre of musical instruments such as the violin and the flute, and if the pitch of a track chunk is in the alto scale range, the timbre of the instrument for the main melody such as the piano and the guitar can be set for it, and if the pitch of a track chunk is in the bass scale range, the timbre of the musical instrument with heavy tone such as the organ and the bass can be set for it.

Similarly, the greater volume can be set to track chunks in the alto scale range to highlight the main melody, while the volume can be reduced appropriately to prevent stress on the user's ears for the track chunks in the treble scale range and bass scale range.

The present application sets the MIDI information of the track chunks on the basis of the second ordinate of the track chunk, and specifically sets music attributes such as pitch, timbre and volume of the track chunk so as to make the generated music more consistent with music theory and improve the effect of generating music from pictures.

In the apparatus for generating the music file in some embodiments of the present application, the apparatus for generating the music file further comprises the receiving module for receiving the first input, wherein the first input is the input for selecting the preset music feature;

The processing module is also for determining the target music feature in response to the first input, and the target music feature comprises at least one of the following: music style, music mood and music genre; adjusting the music according to the music feature;

The apparatus for generating a music file further comprises the playing module for playing the music file.

In an embodiment of the present application, the user can perform music theory adjustment on music generated according to the first image by selecting a plurality of preset music features and selecting the target music feature. Herein, target music feature, comprises a music style, such as: pop music, classical music, electronic music, etc., musical mood such as: enrichment, depression, relaxation, etc., and musical genre, such as: rock, jazz, blue, etc.

According to the target music feature selected by the user, the music generated according to the first image is adjusted so as to make the adjusted music more consistent with the music feature selected by the user, and if the user selects classical music, soothing and blue tone, the volume of the middle frequency and the low frequency can be appropriately increased. Meanwhile, a time interval of the second abscissa is adjusted so as to make the music rhythm slower and soothing.

Meanwhile, the second ordinate of the track chunk in the MIDI coordinate system can also be further post-processed according to the preset music theory data and acoustic data. For example, a tunability can be preset, and the range of the highest scale and the lowest scale can be specified. If the highest scale and the lowest scale of the track chunk within a period of time exceed the range, the pitch of the track chunk outside the range is adjusted according to a certain adjustment rule, i. e., turning the pitch outside the range back. For example, decreasing the pitch of the track chunk above the highest scale threshold by one octave, or increasing the pitch of the track chunk below the lowest scale threshold by one octave, etc. so that the adjusted music is more consistent with the music theory. After adjustment, the adjusted music can be automatically played, enabling the user to immediately get the music generated according to the "images containing memories" selected by the user and enjoy the pleasure of music creation.

In the apparatus for generating a music file of some embodiments of the present application, the generation module is further used for generating the second image corresponding to the music.

The playing module is also for displaying the second image and playing the music file.

In an embodiment of the present application, it is also possible to generate the second image corresponding to playing the music file, and display the second image while playing the music file, so that the user experiences both visual and auditory enjoyment. Herein, the second image may be the still picture generated according to the first image selected by the user, or the salient feature texture map corresponding to the first image, and the still picture and a playing progress of the music are displayed when the music file is played.

The second image can also be the animation file generated according to the preset template, or the playing interface of the MIDI information coordinate system, and the duration of the animation file matches that of the generated music, and the animation is played while the music file is played so as to further improve the visual experience of the user.

For the apparatus for generating the music file of some embodiments of the present application, the receiving module is also used for receiving a second input, wherein the second input is the input for selecting a preset video template;

the processing module is also used for determining the object video template in response to the second input;
the generation module is also used for generating the second image according to the object video template and the salient object texture map.

In an embodiment of the present application, a background image when music is played may be generated by receiving the second input from the user, the object video template selected according to the second input from the user, and the salient object texture map corresponding to the first image. The video template can be the continuous animation template, and can also be the "slide" showing multiple still pictures in turns.

In the animation template, the salient object texture map corresponding to the first image is displayed in a superimposed manner, and when the user sees the second image, the memory of the first image may be aroused and this may improve the user's use experience.

For the apparatus for generating the music file of some embodiments of the present application, the generation module is also used for generating the object animation via the piano roll graphical interface, wherein the object animation is used for showing the playing progress of the music; generating the second image according to the object animation and the salient object texture map.

In an embodiment of the present application, the object animation is generated via the piano roll graphical interface, wherein the object animation is a process of playing the track chunk in the MIDI file in the piano roll graphical interface. Meanwhile, in the background of the interface, according to the salient object texture map corresponding to the first image as a background image of the second image, an explicit visual connection is established between the second image and the first image, so that the user can watch the second image associated with the "images containing memories" while listening to music, thereby arousing the user's memory and enriching the user's visual experience.

The apparatus for generating the music file in the embodiments of the present application may be an apparatus or may be a component, an integrated circuit, or a chip in a terminal. The apparatus may be a mobile electronic device or a non-mobile electronic device. By way of example, the mobile electronic device may be a mobile phone, a tablet computer, a notebook computer, a palmtop computer, a vehicle-mounted electronic device, a wearable device, an ultra-mobile personal computer (UMPC), a webbook or a personal digital assistant (PDA), etc. and the non-mobile electronic device may be a server, a Network Attached Storage (NAS), a personal computer (PC), a television (TV), a teller machine or a self-help machine, etc. and the embodiments of the present application are not particularly limited.

The apparatus for generating the music file in the embodiment of the present application may be an apparatus having an operating system. The operating system may be an Android operating system, may be an iOS operating system, and may also be other possible operating systems, and the embodiments of the present application are not particularly limited.

An apparatus for generating the music file according to an embodiment of the present application is capable of implementing respective processes implemented by the above-described method embodiments. In order to avoid repetition, the description thereof will not be repeated.

Figure 9:
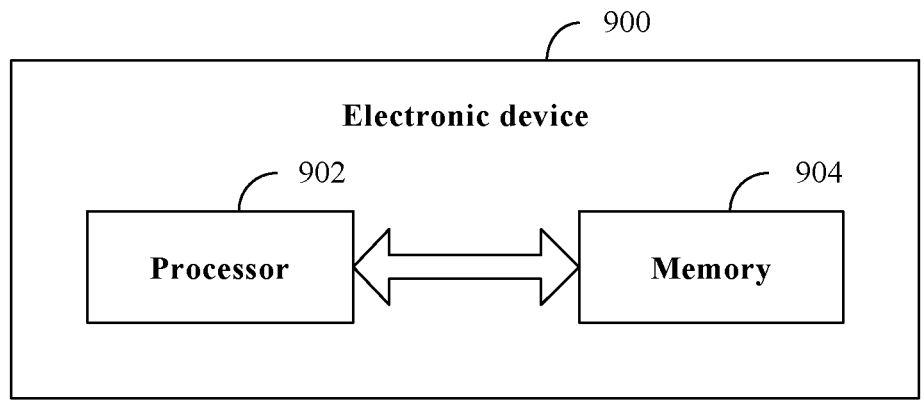
FIG. 9 illustrates a structural block diagram of an electronic device according to an embodiment of the present application.

Optionally, the embodiment of the present application also provides an electronic device 900. FIG. 9 illustrates a structural block diagram of an electronic device according to an embodiment of the present application. As shown in FIG. 9, the electronic device 900 comprises a processor 902, a memory 904, and a program or instructions stored in the memory 904 and capable of running on the processor 902, and the program or instructions, when executed by the processor 902, implement the various processes of the above-mentioned method embodiment and can achieve the same technical effect. In order to avoid repetition, the description will not be repeated here.

It is noted that the electronic the embodiments of the present application comprise the mobile electronic devices and the non-mobile electronic devices described above.

Figure 10:
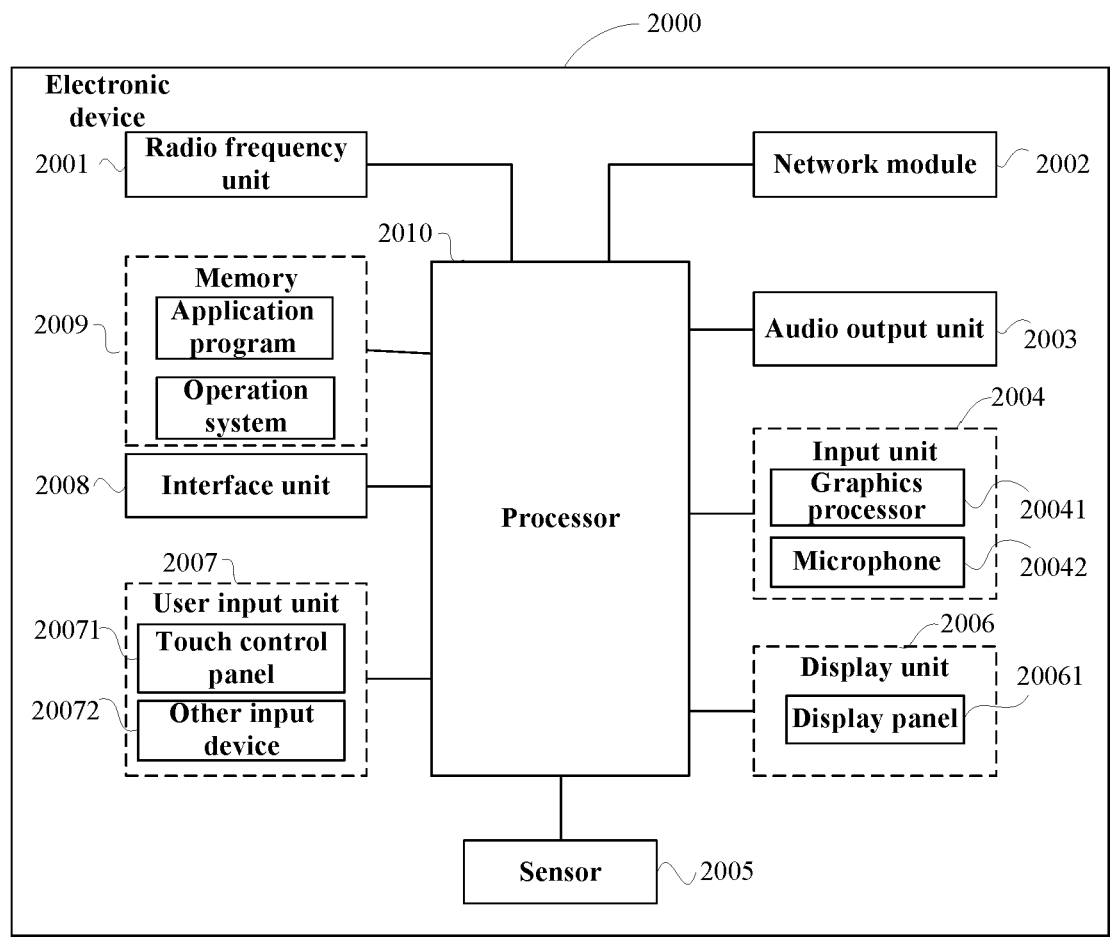
FIG. 10 is a schematic diagram of the hardware structure of an electronic device for realizing the embodiment of the present application.

FIG. 10 is a schematic diagram of the hardware structure of an electronic device for realizing the embodiment of the present application.

The electronic device 2000 comprises, but is not limited to: a radio frequency unit 2001, a network module 2002, an audio output unit 2003, an input unit 2004, a sensor 2005, a display unit 2006, a user input unit 2007, an interface unit 2008, a memory 2009, and a processor 2010, etc.

Those skilled in the art will appreciate that the electronic device 2000 may also comprise a power source (e.g., a battery) for powering the various components. The power source may be logically connected to the processor 2010 through a power management system for managing charge, discharge, and power consumption. The configuration of the electronic device shown in FIG. 10 is not to be construed as limiting the electronic device, and the electronic device may comprise more or fewer components than shown, or some components may be combined, or a different arrangement of components, and will not be described in detail herein.

The processor 2010 is used for obtaining the first image; performing feature extraction on the first image to obtain the salient feature of the first image; mapping the salient feature into the MIDI information coordinate system based on the position of the salient feature in the first image, and determining MIDI information corresponding to the salient feature; the MIDI information coordinate system being used for indicating correspondence between the MIDI information and the time; generating the music file based on correspondence between the MIDI information and the time.

Optionally, the image content of the first image comprises the salient object, and the salient feature comprises at least one of the following: the key point of the salient object and the edge feature point of the salient object.

Optionally, the processor 2010 is further used for performing object segmentation on the first image through a convolutional neural network to obtain the salient object in the first image and the edge feature point of the salient object; extracting the key point of the salient object to obtain the key point of the salient object.

Optionally, the processor 2010 is further used for generating the salient object texture map corresponding to the first image according to the salient feature; determining the position of the salient feature in the first image according to the salient object texture map.

Optionally, the processor 2010 is further used for performing edge detection on the first image according to the edge feature point and the Canny edge detection algorithm to obtain the edge image of the salient object; generating the salient object graph corresponding to the salient object according to the key point and the edge feature point; performing image superposition on the edge image and the salient object graph to obtain the salient object texture map corresponding to the first image.

Optionally, the processor 2010 is further used for dividing the object texture map into X×Y image units with x rows and y columns, wherein both x and y are integers greater than 1, and the image units comprise at least one of bright pixels and dark pixels, and the bright pixels are pixels with a brightness value of 1 and the dark pixels are pixels with a brightness value of 0; determining an object image unit with the number of bright pixels greater than the preset ratio among X×Y image units to obtain n object image units, wherein the number of salient features of the first image is n, and the n object image units are in one-to-one correspondence with the n salient features, and n is a positive integer; determining a first ordinate of the salient feature in the first image according to the number of rows of each of then object image units in the X×Y image units; determining a first abscissa of the salient feature in the first image according to the number of columns of each of the n object image units in the X×Y image units; determining the position of the salient feature in the first image according to the abscissa of the salient feature and an abscissa and the ordinate and of the salient feature.

Optionally, the processor 2010 is also used for converting the first ordinate into the MIDI information coordinate system to obtain a second ordinate of the salient feature in the MIDI information coordinate system; converting the first abscissa into the MIDI information coordinate system to obtain a second abscissa of the salient feature in the MIDI information coordinate system; according to the second ordinate and the second abscissa, mapping the n salient features into the MIDI information coordinate system to obtain n track chunks corresponding to the n salient features one by one.

Optionally, the track chunk contains the MIDI information, and the processor 2010 is further used for determining the MIDI information according to the second ordinate corresponding to the track chunk; wherein, the MIDI information comprises at least one of the following information: pitch, timbre and volume.

Optionally, the user input unit 2007 is used for receiving the first input, wherein the first input is an input for selecting the preset music feature.

The processor 2010 is also used for determining the target music feature in response to the first input, wherein the target music feature comprises at least one of the following: music style, music mood and music genre; adjusting the music according to the music feature.

The audio output unit 2003 is used for playing the music file.

Optionally, the processor 2010 is also used for generating the second image corresponding to the music file.

The display unit 2006 is also used to display the second image, and the audio output unit 2003 is also used for playing the music file.

Optionally, the user input unit 2007 is further used for receiving the second input, wherein the second input is the input for selecting the preset video template.

The processor 2010 is further used for determining the object video template in response to the second input; generating the second image according to the object video template and the salient object texture map.

Optionally, the processor 2010 is also used for generating an object animation through the piano roll graphical interface, wherein the object animation is used for showing the playing progress of the music; generating the second image according to the object animation and the salient object texture map.

According to the embodiment of the present application, music is constructed by images, so that the formed music corresponds to the images containing the memories of users. On the one hand, the "green hand" user who does not have music theory knowledge cam also construct corresponding music according to a picture, and on the other hand, track chunks are display by means of the MIDI information coordinate system, so that the final construct music is visualized, giving the user a unique auditory and visual experience.

It should be appreciated that in embodiments of the present application, input unit 2004 may comprise a Graphics Processing Unit (GPU) 20041 that processes image data for still pictures or video obtained by an image capture device, such as a camera, in a video capture mode or an image capture mode, and a microphone 20042.

The display unit 2006 may comprise a display panel 20061 which may be configured in the form of a liquid crystal display, an organic light emitting diode, or the like. The user input unit 2007 comprises a touch panel 20071 and other input devices 20072. The touch panel 20071, also known as a touch screen. The touch panel 20071 may comprise two parts, a touch detection device and a touch controller. The other input devices 20072 may comprise, but are not limited to, a physical keyboard, function keys (e.g., volume control keys, switch keys, etc.), a trackball, a mouse, a joystick, etc. which will not be described in detail herein. The memory 2009 may be used to store software programs and various data, comprising but not limited to application programs and operating systems. The processor 2010 may integrate an application processor that primarily handles operating systems, user interfaces, applications, etc. and a modem processor that primarily handles wireless communications. It will be appreciated that the modem processor described above may not be integrated into the processor 2010.

The embodiments of the present application also provide a readable storage medium, on which a program or instructions are stored, and when the program or instructions are executed by a processor, various processes of the above-mentioned method embodiments are implemented, and the same technical effects can be achieved. In order to avoid repetition, the description herein will not be repeated.

The processor is a processor in the electronic device in the above-mentioned embodiment. The readable storage medium comprises a computer readable storage medium such as a computer read-only Memory (ROM), a Random Access Memory (RAM), a magnetic or optical disk, etc.

In addition, the embodiments of the present application provide a chip comprising a processor and a communication interface, and the communication interface is coupled to the processor, and the processor is used for running a program or instructions to implement various processes of the above-mentioned method embodiments and can achieve the same technical effect. In order to avoid repetition, the description thereof will not be repeated.

It should be understood that a chip referred to in embodiments of the present application may also be referred to as a system-on-a-chip, a system chip, a chip system, or a system-on-chip chip.

It should be noted that, as used herein, the terms "comprises", "comprising", or any other variation thereof, are intended to cover a non-exclusive inclusion, such that a process, method, article, or apparatus that comprises a list of elements does not comprise only those elements but may comprise other elements not expressly listed or inherent to such process, method, article, or apparatus. An element proceeded by "comprises a . . . " does not, without more constraints, preclude the existence of additional identical elements in the process, method, article, or apparatus that comprises the element. Furthermore, it should be noted that the scope of the method and apparatus in the embodiments of the present application is not limited to the order of performing the functions shown or discussed, and may comprise performing the functions in a substantially simultaneous manner or in a reverse order depending on the functionality involved, e.g., the method described may be performed in a different order than described and various steps may be added, omitted, or combined. In addition, features described with reference to certain examples may be combined in other examples.

From the description of the embodiments given above, it will be clear to a person skilled in the art that the method of the embodiments described above can be implemented by means of software plus a necessary general purpose hardware platform, but of course also by means of hardware, the former being in many cases a better embodiment. Based on such an understanding, the technical solution of the present application, in essence or in part contributing to the prior art, can be embodied in the form of a computer software product stored in a storage medium (such as a ROM/RAM, a magnetic disk, an optical disk), comprising a plurality of instructions for causing a terminal (which can be a mobile phone, a computer, a server, or a network device, etc.) to execute the method described in various embodiments of the present application.

Although the embodiments of the present application have been described above with reference to the accompanying drawings, the present application is not limited to the above-mentioned specific embodiments, which are merely illustrative and not restrictive. A person skilled in the art, with the inspiration of the present application, would have been able to make many forms without departing from the spirit of the present application and the scope of protection of the claims, and these forms all fall within the scope of protection of the present application.

We claim:
1. A method for generating a music file, comprising:
obtaining a first image;
performing feature extraction on the first image to obtain a salient feature of the first image;
mapping the salient feature into a musical instrument digital interface (MIDI) information coordinate system based on a position of the salient feature in the first image, so as to determine MIDI information corresponding to the salient feature, the MIDI information coordinate system being used for indicating correspondence between the MIDI information and time; and
generating a music file based on the correspondence between the MIDI information and time;
generating a second image corresponding to the music file;
wherein generating a second image corresponding to the music comprises:
receiving a second input, wherein the second input is an input for selecting a preset video template;
determining an object video template in response to the second input; and
generating the second image according to the object video template and a salient object texture map.

2. The method for generating a music file according to claim 1, wherein an image content of the first image comprises a salient object, and the salient feature comprises at least one of:
a key point of the salient object or an edge feature point of the salient object.

3. The method for generating a music file according to claim 2, wherein performing feature extraction on the first image to obtain a salient feature of the first image comprises:
performing object segmentation on the first image through a convolutional neural network to obtain the salient object in the first image and the edge feature point of the salient object; and
performing key point extraction on the salient object to obtain a key point of the salient object.

4. The method for generating a music file according to claim 2, wherein prior to mapping the salient feature into the MIDI information coordinate system based on a position of the salient feature in the first image, the method for generating a music file further comprises:
generating the salient object texture map corresponding to the first image according to the salient feature; and
determining a position of the salient feature in the first image according to the salient object texture map.

5. The method for generating a music file according to claim 4, wherein generating the salient object texture map corresponding to the first image according to the salient feature comprises:
performing edge detection on the first image according to the edge feature point and a Canny edge detection algorithm to obtain an edge image of the salient object;

generating a salient object graph corresponding to the salient object according to the key point and the edge feature point; and performing image superposition on the edge image and the salient object graph to obtain the salient object texture map corresponding to the first image.

6. The method for generating a music file according to claim 4, wherein determining a position of the salient feature in the first image according to the salient object texture map comprises:

dividing the object texture map into X×Y image units with x rows and y columns, wherein both x and y are integers greater than 1, and the image units comprise at least one of bright pixels and dark pixels, and the bright pixels are pixels with a brightness value of 1 and the dark pixels are pixels with a brightness value of 0;

determining an object image unit with a ratio of bright pixels greater than a preset ratio among X×Y image units to obtain N object image units, wherein the number of salient features of the first image is N, and the N object image units are in one-to-one correspondence with the N salient features, and N is a positive integer;

determining a first ordinate of the salient feature in the first image according to a number of rows of each of the n object image units in the X×Y image units;

determining a first abscissa of the salient feature in the first image according to a number of columns of each of the n object image units in the X×Y image units; and determining a position of the salient feature in the first image according to an abscissa of the salient feature and an abscissa and an ordinate and of the salient feature.

7. The method for generating a music file according to claim 6, wherein mapping the salient feature into a MIDI information coordinate system based on a position of the salient feature in the first image comprises:

converting the first ordinate into the MIDI information coordinate system to obtain a second ordinate of the salient feature in the MIDI information coordinate system;

converting the first abscissa into the MIDI information coordinate system to obtain a second abscissa of the salient feature in the MIDI information coordinate system; and according to the second ordinate and the second abscissa, mapping the N salient features into the MIDI information coordinate system to obtain N track chunks corresponding to the N salient features one by one.

8. The method for generating the music file according to claim 7, wherein the track chunk contains the MIDI information, and the MIDI information is determined according to a second ordinate corresponding to the track chunk;

wherein, the MIDI information comprises at least one of: pitch, timbre or volume.

9. The method for generating a music file according to claim 4, further comprising:

receiving a first input, wherein the first input is an input for selecting a preset music feature;

determining a target music feature in response to the first input, wherein the target music feature comprises at least one of the following: music style, music mood or music genre;

adjusting the music according to the music feature; and playing the music file.

10. The method for generating the music file according to claim 9, wherein playing the music comprises:
displaying the second image and playing the music.

11. The method for generating a music file according to claim 1, wherein generating a second image corresponding to the music comprises:

generating an object animation through a piano roll graphical interface, wherein the object animation is used for showing a playing progress of the music; and generating the second image according to the object animation and the salient object texture map.

12. An electronic device, comprising a processor, a memory and a program or instructions stored in the memory and executable on the processor, wherein the program or instructions, when executed by the processor, performs:

obtaining a first image;

performing feature extraction on the first image to obtain a salient feature of the first image;

mapping the salient feature into a musical instrument digital interface (MIDI) information coordinate system based on a position of the salient feature in the first image, so as to determine MIDI information corresponding to the salient feature; the MIDI information coordinate system being used for indicating correspondence between the MIDI information and time; and generating a music file based on the correspondence between the MIDI information and time;

generating a second image corresponding to the music file;

wherein generating a second image corresponding to the music comprises:

receiving a second input, wherein the second input is an input for selecting a preset video template;

determining an object video template in response to the second input; and generating the second image according to the object video template and a salient object texture map.

13. The electronic device for generating a music file according to claim 12, wherein an image content of the first image comprises a salient object, and the salient feature comprises at least one of:

a key point of the salient object or an edge feature point of the salient object.

14. The electronic device for generating a music file according to claim 13, wherein performing feature extraction on the first image to obtain a salient feature of the first image comprises:

performing object segmentation on the first image through a convolutional neural network to obtain the salient object in the first image and the edge feature point of the salient object; and performing key point extraction on the salient object to obtain a key point of the salient object.

15. The electronic device for generating a music file according to claim 13, wherein prior to mapping the salient feature into the MIDI information coordinate system based on a position of the salient feature in the first image, the program or instructions further performs:

generating the salient object texture map corresponding to the first image according to the salient feature; and determining a position of the salient feature in the first image according to the salient object texture map.

16. The electronic device for generating a music file according to claim 15, wherein generating the salient object texture map corresponding to the first image according to the salient feature comprises:

performing edge detection on the first image according to the edge feature point and a Canny edge detection algorithm to obtain an edge image of the salient object;

generating a salient object graph corresponding to the salient object according to the key point and the edge feature point; and performing image superposition on the edge image and the salient object graph to obtain the salient object texture map corresponding to the first image.

17. The electronic device for generating a music file according to claim 15, wherein determining a position of the salient feature in the first image according to the salient object texture map comprises:

dividing the object texture map into X×Y image units with x rows and y columns, wherein both x and y are integers greater than 1, and the image units comprise at least one of bright pixels and dark pixels, and the bright pixels are pixels with a brightness value of 1 and the dark pixels are pixels with a brightness value of 0;

determining an object image unit with a ratio of bright pixels greater than a preset ratio among X×Y image units to obtain N object image units, wherein the number of salient features of the first image is N, and the N object image units are in one-to-one correspondence with the N salient features, and N is a positive integer;

determining a first ordinate of the salient feature in the first image according to a number of rows of each of the n object image units in the X×Y image units;

determining a first abscissa of the salient feature in the first image according to a number of columns of each of the n object image units in the X×Y image units; and determining a position of the salient feature in the first image according to an abscissa of the salient feature and an abscissa and an ordinate and of the salient feature.

18. The electronic device for generating a music file according to claim 17, wherein mapping the salient feature into a MIDI information coordinate system based on a position of the salient feature in the first image comprises:

converting the first ordinate into the MIDI information coordinate system to obtain a second ordinate of the salient feature in the MIDI information coordinate system;

converting the first abscissa into the MIDI information coordinate system to obtain a second abscissa of the salient feature in the MIDI information coordinate system; and according to the second ordinate and the second abscissa, mapping the N salient features into the MIDI information coordinate system to obtain N track chunks corresponding to the N salient features one by one.

19. A readable non-transitory storage medium, wherein a program or instruction is stored on the readable storage medium, and the program or instruction, when executed by a processor, performs:

obtaining a first image;

performing feature extraction on the first image to obtain a salient feature of the first image;

mapping the salient feature into a musical instrument digital interface (MIDI) information coordinate system based on a position of the salient feature in the first image, so as to determine MIDI information corresponding to the salient feature; the MIDI information coordinate system being used for indicating correspondence between the MIDI information and time; and generating a music file based on the correspondence between the MIDI information and time;

generating a second image corresponding to the music file;

wherein generating a second image corresponding to the music comprises:

receiving a second input, wherein the second input is an input for selecting a preset video template;

determining an object video template in response to the second input; and generating the second image according to the object video template and a salient object texture map.

* * * * *